United States Patent [19]

Dorsey, Jr.

[11] 4,097,312

[45] Jun. 27, 1978

[54] PRETREATMENT FOR THE RESISTANCE WELDING OF ALUMINUM

[75] Inventor: Geoffrey A. Dorsey, Jr., Danville, Calif.

[73] Assignee: Kaiser Aluminum & Chemical Corporation, Oakland, Calif.

[21] Appl. No.: 714,155

[22] Filed: Aug. 13, 1976

Related U.S. Application Data

[63] Continuation-in-part of Ser. No. 709,026, Jul. 7, 1976, which is a continuation-in-part of Ser. No. 610,966, Sep. 8, 1975, Pat. No. 4,004,951, which is a continuation-in-part of Ser. No. 593,092, Jul. 3, 1975, abandoned.

[51] Int. Cl.$^2$ ................................................. C23F 7/06
[52] U.S. Cl. .................................... 148/6.27; 148/6.3; 427/419 D
[58] Field of Search ................ 148/6.27, 6.3; 427/318, 427/327, 419 D; 204/35 N, 38 A

[56] References Cited

U.S. PATENT DOCUMENTS

| 2,963,391 | 12/1960 | Kubie | 148/6.14 |
| 3,734,784 | 5/1973 | Bereday et al. | 148/6.27 |
| 3,799,848 | 3/1974 | Kolic et al. | 204/38 E |

Primary Examiner—Ralph S. Kendall
Attorney, Agent, or Firm—Paul E. Calrow; Edward J. Lynch

[57] ABSTRACT

This invention relates to a method of pretreating an aluminum surface for the resistance welding thereof wherein an oxide coating is formed on the aluminum surface having a controlled electrical resistance and then the oxidized surface is stabilized by treatment with a hot aqueous alkaline solution containing long chain carboxylic acids.

16 Claims, No Drawings

PRETREATMENT FOR THE RESISTANCE WELDING OF ALUMINUM

RELATED APPLICATIONS

This application is a continuation-in-part of Ser. No. 709,026 filed July 7, 1976, which in turn is a continuation-in-part of Ser. No. 610,966 filed Sept. 8, 1975, now U.S. Pat. No. 4,004,951 which is a continuation-in-part of Ser. No. 593,092 filed July 3, 1975, now abandoned.

BACKGROUND OF THE INVENTION

This invention relates to an improved method of pretreating aluminum products for the resistance welding thereof.

One of the major problems in the resistance welding of aluminum products is the large and frequently erratic variation in electrical resistance of the oxidized aluminum surface. A freshly cleaned aluminum surface has an electrical resistance of about 10 microhms. This resistance is usually too low for effective reistance welding due to the rapid deterioration of the electrode which it frequently causes. Only about 20–400 spot welds can usually be made before the electrode needs replacement. Thick natural oxide coatings can have a resistance exceeding 2000 microhms which also causes a rapid deterioration of the electrode tip. Frequently, less than 50 spot resistance welds can be made before replacement of the electrode is necessary. Desirably, the electrical resistance is at a consistent level within the range of about 25–500, preferably about 50–300, microhms. This range of electrical resistance would provide sound welds and long electrode life. However, maintaining such a surface resistance consistently with aluminum products has been heretofore a practical impossibility due to the rapidly changing nature of an aluminum surface. This is particularly true in many commercial fabricating facilities, such as automotive and truck assembly lines where time delays and harsh environments are frequently unavoidable.

It is against this background that the present invention was developed.

DESCRIPTION OF THE INVENTION

This invention generally relates to an improved method of pretreating aluminum to facilitate the resistance welding thereof. In particular, the invention is directed to a method of generating an oxide coating on an aluminum surface having a controlled electrical resistance and then forming a particular coating on the oxidized surface which retards further oxidation of the aluminum surface but which does not interfere with the resistance welding of the aluminum substrate.

In accordance with the invention, the aluminum surface is oxidized to a controlled level of electrical resistance and then the freshly oxidized aluminum surface is treated with an aqueous alkaline solution containing long chain aliphatic carboxylic acids as described in co-pending applications Ser. No. 610,966 now U.S. Pat. No. 4,004,951 and Ser. No. 709,026, both assigned to the present assignee. The hydrophobic coatings formed by this latter treatment prevents further oxidation of the aluminum substrate and the aging of the controlled oxide layer formed so that the electrical resistance of the surface remains relatively constant over long periods of time. The hydrophobic coating formed by the latter processing step does not significantly increase the electrical resistance to the coating nor does it detrimentally affect the resistance welding of the aluminum substrate.

Generally, the oxide layer having a controlled level of electrical resistance can be developed by any convenient manner. The surface can be oxidized by natural oxidation, by thermal treating in an oxidizing atmosphere, treatment with hot water or steam or by various other chemical treatments. The oxidation of the aluminum surface should be controlled so that the initial electrical resistance of the fresh oxide is less than 500 microhms, preferably less than 300 microhms but greater than 25 microhms, preferably greater than 50 microhms. The other characteristics of the oxide are relatively immaterial, provided that the electrical resistance is maintained within these limits.

One attractive method for developing an oxide coating described above is set forth in co-pending application Ser. No. 714,157 filed Aug. 13, 1976 assigned to the present assignee. This process generally comprises treating the aluminum surface with a hot aqueous solution at neutral or slightly basic conditions which is essentially saturated with a difficulty soluble magnesium compound. Suitable magnesium compounds are those magnesium compounds which are soluble in distilled or deionized water at 20° C in amounts less than 30 grams/liter, such as magnesium carbonate, magnesium hydroxide, magnesium oxide, magnesium silicate and magnesium sulfate. Magnesium carbonate is preferred. The pH of the solution can range from about 7–9, preferably about 7.5–8.5, and the temperature of the solution should range from about 65° C and the boiling point of the solution, preferably about 75°–95° C. Treatment time, which generally exceeds 5 seconds and is less than 5 minutes, is the primary control parameter for obtaining an oxide coating having the desired electrical resistance. The electrical resistance of the fresh oxide surface formed by this process under a particular set of bath conditions can be readily controlled in a predictable manner to between about 25 and 500 microhms, preferably 50–300 microhms, by merely controlling treatment times. Generally, treatment times can be shortened by increasing the pH of the bath, the temperature of the bath or both. It is preferred to include up to 1% by weight of nonionic or cationic wetting agents, such as Tergitol NPX, in the solution to insure uniform oxide growth completely across the surface of the treated aluminum workpiece.

One characteristic of the oxide coating developed by this process is that it retains its freshness and the resistance thereof is stable for longer periods (e.g., 1–3 days) than natural oxide coatings. However, after about two weeks, the resistance of the present coating will be more or less equivalent to the resistance of a natural oxide coating when subjected to the same conditions.

After the oxide coating is formed, it is treated with a hot aqueous alkaline solution containing long chain aliphatic carboxylic acid or its equivalent as described and claimed in Ser. No. 610,966 now U.S. Pat. No. 4,004,951 or Ser. No. 709,026 which are hereby incorporated herein by reference in their entirety. Preferably, the aluminum oxide surface is treated with the alkaline solution containing the carboxylic acid very soon after formation of the oxide, but depending upon the alloy composition of the aluminum workpiece and how the oxide was formed, the treatment with the alkaline carboxylate solution can be effectively applied to the oxide coating up to 12 hours after the oxide coating has been formed with no significant change in the electrical resistance thereof. After about 24–48 hours of aging, the reaction between the carboxylic acid and the oxidized aluminum surface is very slow. The aqueous solution containing the carboxylic acid should be maintained at a temperature from about 65° up to the boiling point of the solution, preferably from about 75°–90° C. The pH should be maintained between about 8 and 10, preferably between 8.5 and 9.5. Treatment times can range from about 0.1 to 60 seconds or more.

The long chain aliphatic carboxylic acid content of the aqueous solution should be in excess of 1 part per million with operating levels ranging from about 0.01 to 10 grams/liter. Long chain aliphatic carboxylic acid or its equivalent should have from 12–22 carbon atoms, preferably 14–20, and may either be straight chain or branch chain isomers thereof. Suitable carboxylic acids include myristic acid, palmitic acid, stearic acid, oleic acid, ricinoleic acid, linoleic acid, arachidic acid, the branch chain isomers thereof and the like. Preferably, the alkali metal salts of the above acids are used or generated in the alkaline solution. Potassium and sodium salts are the most desirable. Other carboxylate compounds which generate the equivalent carboxylate anions in the alkaline solution required can be employed. The alkalinity of the solution can be maintained by additions of alkaline compounds, such as sodium and potassium hydroxide.

The hydrophobic coating formed by treatment in the alkaline carboxylic acid solution generally is compatible with and to a certain extent depending upon the carboxylate compound employed, is readily wet by oil-based fabricating lubricants and other oily contaminants normally found in metal fabricating shops. However, once the hydrophobic coating is formed on the oxide surface having a controlled resistance, such surface contaminants do not detrimentally affect the resistance welding of the aluminum products.

The following examples are given to illustrate embodiments of the invention.

A group of 2036-T4 aluminum alloy panels were first etched in a concentrated aqueous solution of sodium hydroxide, water rinsed and then treated for about 30 seconds in an aqueous solution containing about 1 gram/liter $MgCO_3$ (a saturated solution) with pH controlled to about 8.0 and the bath temperature controlled to about 80° C. THe solution also contained a nonionic wetting agent (Tergitol NPX) at a level of about 0.1 ml/liter of solution. This treatment formed a relatively thin aluminum oxide coating of about 100 Å with an electrical resistance of about 75 microhms. The panels were removed from the treatment bath and rinsed with water. One portion of the panels was treated in a hot aqueous alkaline solution containing stearic acid in accordance with Ser. No. 610,966 and a second portion of the panels was treated in a hot aqueous alkaline solution containing isostearic acid (the methyl branched chain isomer of stearic acid) under the exact same conditions in accordance with Ser. No. 709,026. Each group of specimens was then subjected to numerous spot resistance welding with essentially the same electrode pressure and electrical current until the electrode tip of the welding machine was no longer suitable for producing acceptable welds. The specimens having the coating formed in the aqueous alkaline solution of stearic acid allowed over 3000 spot welds before the electrode tip needed replacement. The specimens having the coating which had been formed in the aqueous alkaline solution of isostearic acid allowed approximately 2000 spot welds before the tips needed replacement. This represents an increase of 10–100 times the number of spot welds on aluminum heretofore obtained in commercial practice with the same electrode.

The electrical resistance measurements of the aluminum surfaces described herein were measured by means of a surface resistance analyzer Model No. VT-11A sold by the C. B. Smith Company. All discussions herein to surface electrical resistance refer to surface electrical resistance as measured by the aforesaid surface resistance analyzer or its equivalent.

It is obvious that various modifications and improvements can be made to the invention without departing from the spirit thereof and the scope of the appended claims.

What is claimed is:

1. A method of preparing an aluminum workpiece for the resistance welding thereof comprising
   (a) developing a freshly oxidized surface on the aluminum workpiece having a surface resistance of at least 25 but less than about 500 microhms; and
   (b) stabilizing the freshly oxidized aluminum surface by treating with a hot aqueous alkaline solution having a pH of about 8–10 and containing at least one part per million of a long chain aliphatic carboxylic acid having from 12–22 carbon atoms or an equivalent carboxylate compound.

2. The method of claim 1 wherein the surface is oxidized by treatment for about 5–60 seconds in a hot aqueous solution containing from about 0.001–30 grams/liter of a difficultly soluble magnesium compound expressed as $MgCO_3$ with the pH of the solution ranging from about 7–9.

3. The method of claim 2 wherein the pH of the oxidizing solution ranges from about 7.5–8.5.

4. The method of claim 2 wherein the magnesium compound is magnesium carbonate.

5. The method of claim 2 wherein the oxidizing solution contains up to 1% by weight of a nonionic or cationic wetting agent to effect uniform oxidation of the aluminum surface.

6. The method of claim 1 wherein the hot aqueous alkaline solution containing the carboxylic acid or an equivalent carboxylate compound has a pH from about 8–10.

7. The method of claim 6 wherein the pH is controlled between about 8.5–9.5.

8. The method of claim 1 wherein the temperature of the hot aqueous alkaline solution containing the carboxylic acid or an equivalent carboxylate compound is maintained between about 65° C and the boiling point of the solution.

9. The method of claim 8 wherein the temperature is maintained between 75° and 95° C.

10. The method of claim 1 wherein the carboxylic acid is selected from the group consisting of stearic acid and isostearic acid.

11. The method of claim 1 wherein the oxidation is controlled to effect a surface resistance between about 50 and 300 microhms.

12. The method of claim 1 wherein the carboxylic acid or an equivalent carboxylate compound has from 14–20 carbon atoms.

13. The method of claim 1 wherein the aluminum surface is oxidized by treating in an oxidizing atmosphere at elevated temperature.

14. The method of claim 1 wherein the aluminum surface is oxidized by treating with hot water.

15. The method of claim 1 wherein the aluminum surface is oxidized by treating with steam.

16. The method of claim 1 wherein the aluminum surface is treated in an oxidizing solution for more than 5 seconds.

* * * * *